US012159595B2

(12) United States Patent
Maruhashi

(10) Patent No.: US 12,159,595 B2
(45) Date of Patent: Dec. 3, 2024

(54) DISPLAY DEVICE AND METHOD OF CONTROLLING DISPLAY DEVICE

(71) Applicant: SHARP KABUSHIKI KAISHA, Sakai (JP)

(72) Inventor: Yuichi Maruhashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/216,178

(22) Filed: Jun. 29, 2023

(65) Prior Publication Data

US 2024/0005882 A1 Jan. 4, 2024

(30) Foreign Application Priority Data

Jun. 30, 2022 (JP) ................................ 2022-105194

(51) Int. Cl.
*G09G 3/34* (2006.01)

(52) U.S. Cl.
CPC ... *G09G 3/3406* (2013.01); *G09G 2320/0257* (2013.01); *G09G 2320/0626* (2013.01)

(58) Field of Classification Search
CPC ......... G09G 3/3406; G09G 2320/0257; G09G 2320/0626
See application file for complete search history.

(56) References Cited

U.S. PATENT DOCUMENTS

2008/0186413 A1* 8/2008 Someya .................. H04N 9/68 348/E5.073
2012/0242904 A1* 9/2012 Shirai .................. G09G 3/3426 348/673
2013/0155125 A1* 6/2013 Inamura .............. G09G 3/3426 345/102

FOREIGN PATENT DOCUMENTS

JP 2010-283790 A 12/2010

* cited by examiner

*Primary Examiner* — Kevin M Nguyen
(74) *Attorney, Agent, or Firm* — ScienBiziP, P.C.

(57) ABSTRACT

A display device comprises a display panel that displays an image; a backlight that illuminates the display panel by irradiating the display panel with light; a scene determiner that determines a scene of an input video image based on a lighting rate of the backlight; a parameter setter that sets a parameter related to a luminance value applied to a plurality of areas of the backlight based on the scene determined by the scene determiner; and a local dimming controller that controls local dimming of the backlight for each of the areas based on the set parameter.

6 Claims, 11 Drawing Sheets

DISPLAY DEVICE AND METHOD OF CONTROLLING DISPLAY DEVICE

CROSS-REFERENCE TO RELATED APPLICATION

The present application claims priority from Japanese Application JP2022-105194, the content to which is hereby incorporated by reference into this application.

BACKGROUND OF THE INVENTION

1. Field of the Invention

The disclosure relates to a display device and a method of controlling the display device.

2. Description of the Background Art

A conventional technique describes a technique for a content playback device to specify the type of acquired content video images and select display parameters for the display in accordance with the specified content type.

Content playback devices such as television receivers may collectively manage profiles of image and sound quality settings in a viewing mode, depending on the viewing environment and video image source. While such complex viewing modes can be provided to accommodate various viewing environments and scenes, they tend to increase the number of options for users to choose from for settings during video playback, making operations more complicated.

In this regard, the configuration according to the conventional techniques allows the content playback device to specify the type of the content video images and provide an appropriate viewing mode. However, for example, movie content may contain various scenes, and depending on the scene, the picture quality settings in the relevant viewing mode may not be optimal.

As one aspect, the purpose of this disclosure is to provide a display device and a method of controlling the display device that enables optimal picture quality settings according to each scene in the content.

SUMMARY OF THE INVENTION

A display device according to an aspect of the disclosure includes a display panel that displays an image; a backlight that illuminates the display panel by irradiating the display panel with light; a scene determiner that determines a scene of an input video image based on a lighting rate of the backlight; a parameter setter that sets a parameter related to a luminance value applied to a plurality of areas of the backlight based on the scene determined by the scene determiner; and a local dimming controller that controls local dimming of the backlight for each of the areas based on the set parameter.

DETAILED DESCRIPTION OF THE INVENTION

First Embodiment

Figure 1:
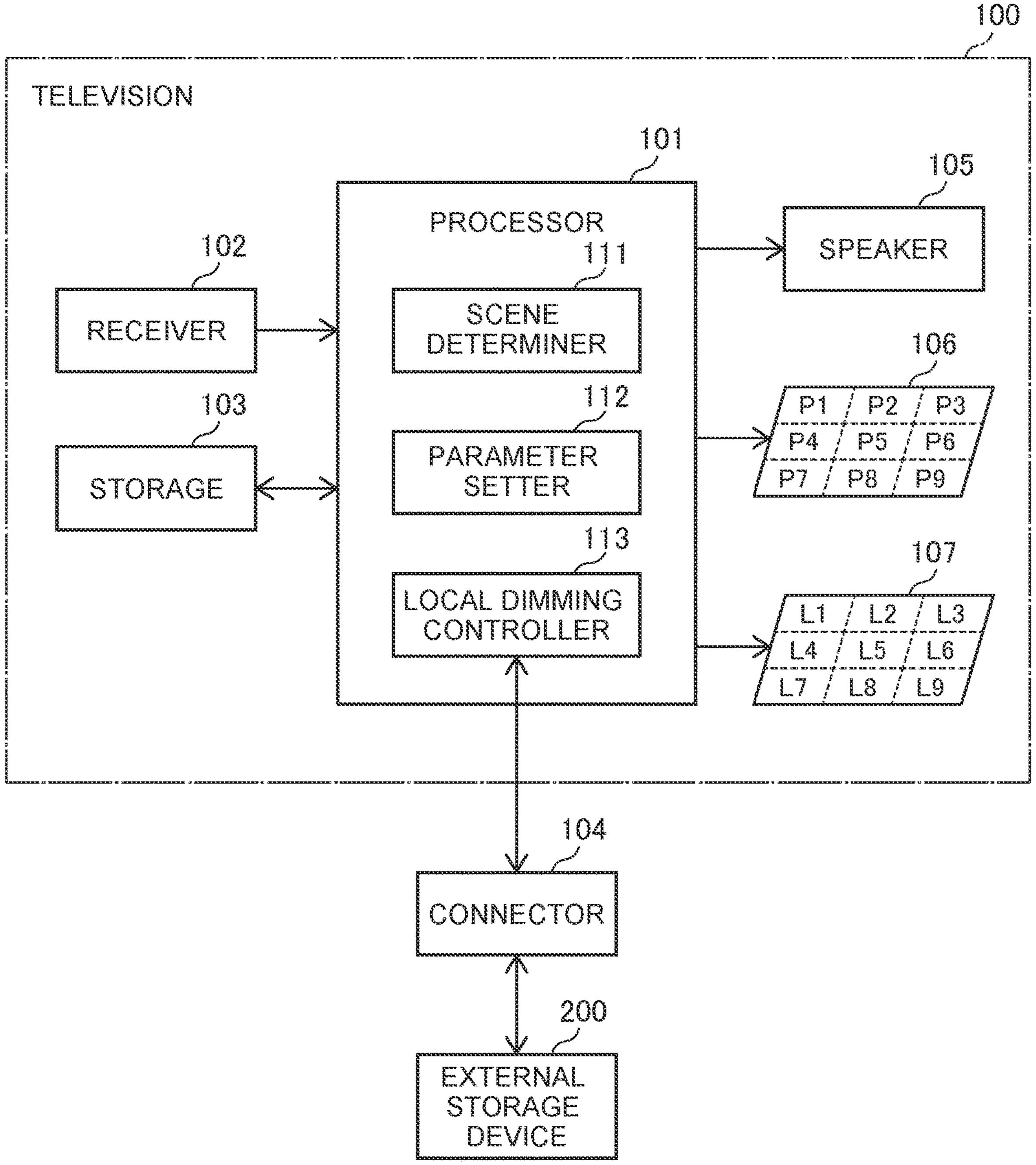
FIG. 1 is a block diagram illustrating an example of a television receiver according to a first embodiment.

A first embodiment will be described below. FIG. 1 is a diagram illustrating an example of a television receiver 100 according to a first embodiment. The television receiver 100 (display device) includes a processor 101, a receiver 102, a storage 103, a connector 104, a speaker 105, a display (display panel) 106, and a backlight 107. The television receiver 100 may have other components, or some of the components in FIG. 1 may be omitted.

The processor 101 includes a scene determiner 111, a parameter setter 112, and a local dimming controller 113. The processor 101 is a computer that executes various processes of the embodiments. The processor 101 includes a processor device and a memory. When the processor device of the processor 101 executes multiple instruction sets (programs) stored in the memory, the processor 101 functions as the scene determiner 111, the parameter setter 112, and the local dimming controller 113, and various types of control of the embodiments may be realized. As the processor device, any processor device may be used, such as a central processing unit (CPU), a graphics processing unit (GPU), or a field programmable gate array (FPGA).

The programs described above are stored in a non-transitory recording medium, such as a semiconductor medium, an optical recording medium, or a magneto-optical recording medium. When the processor device of the processor 101 executes the programs stored in the recording medium, various types of control of the embodiments can be realized. The programs described above may also be acquired by the television receiver 100 from an external server through a network.

The receiver 102 includes, for example, a tuner. The receiver 102 receives broadcast waves distributed by broadcasting apparatuses of one or more broadcasters and performs prescribed signal processing. Such broadcast waves may include a plurality of programs distributed by the broadcasters. The receiver 102 receives broadcast waves in a wireless or wired manner. The broadcast waves are transmitted in terrestrial broadcasting (terrestrial digital television broadcasting) and satellite broadcasting. Examples of the satellite broadcasting include broadcasting satellites (BS) broadcasting, communication satellites (CS) broadcasting, and the new 4K8K satellite broadcasting.

The storage 103 stores various types of information. The storage 103 stores, for example, image quality parameters as image quality information associated with an image quality setting suitable for a video image being displayed on the display 106. The storage 103 may store other information.

The connector 104 is connected to an external storage device 200. The external storage device 200 is a recording device that records data (program data) of programs received by the television receiver 100. The external storage device 200 is a universal serial bus (USB) hard disk, a recorder, or the like.

The processor 101 can record program data received by the receiver 102 in the external storage device 200 via the connector 104. The processor 101 also reads program data recorded in the external storage device 200 via the connector 104 and reproduces the read program data. The external storage device 200 may be, for example, a recording device incorporated in the television receiver 100.

The speaker 105 is a device that outputs audio.

The backlight 107 includes, for example, a plurality of light emitting diodes (LEDs). The backlight 107 illuminates the display 106 with light output from the LEDs. This controls the brightness of the video image displayed on the display 106. The backlight 107 in the present embodiment can control the brightness of the display 106 by dividing the display 106 into multiple areas. That is, the backlight 107 includes, for example, nine (3×3) areas L1 to L9, and the intensity of the light that the respective areas L1 to L9 emits to the display 106 can be controlled independently of each other. Such a technique is known as local-dimming. The example in FIG. 1 illustrates a case in which the backlight 107 includes nine (3×3) areas L1 to L9, but the number of areas and how the areas are divided can be selected as needed.

The display 106 is a liquid crystal display (LCD) or any other display panel. The display 106 displays a video image based on a video image signal from the processor 101. As described above, the brightness of the video image displayed on the display 106 is controlled by the illumination of the backlight 107. At this time, the areas L1 to L9 of the backlight 107 are controlled independently of each other. Therefore, the brightness of areas P1 to P9 of the display 106 corresponding to the areas L1 to L9 is also independently controlled by the areas L1 to L9.

Next, the processor 101 will be described. The scene determiner 111 of the processor 101 performs scene determination on an input video image received from the receiver 102 or from the external storage device 200 via the connector 104. The scene determiner 111 performs scene determination on the basis of the luminance distribution of the input video image and the lighting rate of the backlight 107 when the input video image is displayed on the display 106. The scene determiner 111 determines whether or not the scene of the input video image is of a scene in which bright regions are scattered throughout an overall dark video image. Specifically, the scene determiner 111 determines whether or not the above scene is a scene in which the ratio of regions having a luminance value below or equal to a predetermined value X1 (first luminance value) is R1 or higher and the percentage of regions having a luminance value above or equal to a predetermined value X2 (second luminance value) is R2 or higher. The method of determining a scene will be described below. A scene that satisfies these conditions is one in which bright regions are scattered throughout an overall dark image. An example of such a scene is a scene of a starry sky at night. The parameter applied to the luminance values of the backlight 107 is decided by the parameter setter 112 in accordance with the scene determined by the scene determiner 111. This will be described below.

The parameter setter 112 sets a parameter related to the luminance values applied to the multiple areas L1 to L9 of the backlight 107 on the basis of the scene determined by the scene determiner 111. The parameter is used, for example, to decide the backlight gradation in each of areas L1 to L9, the details of which are described below.

The local dimming controller 113 controls the backlight 107 for each of the areas L1 to L9 on the basis of the parameter set by the parameter setter 112. The local dimming controller 113 sends the video image signal received from the receiver 102 or the external storage device 200 to the display 106 and controls the display 106 to display a video image based on the video signal.

Next, an overview of a scene determination method for an input video image and a backlight control method based on a result of scene determination according to the present embodiment will be described. The present embodiment explains a method of determining a scene that is generally dark but dotted with bright spots, e.g., the video image of a starry sky described above.

Figure 2A:
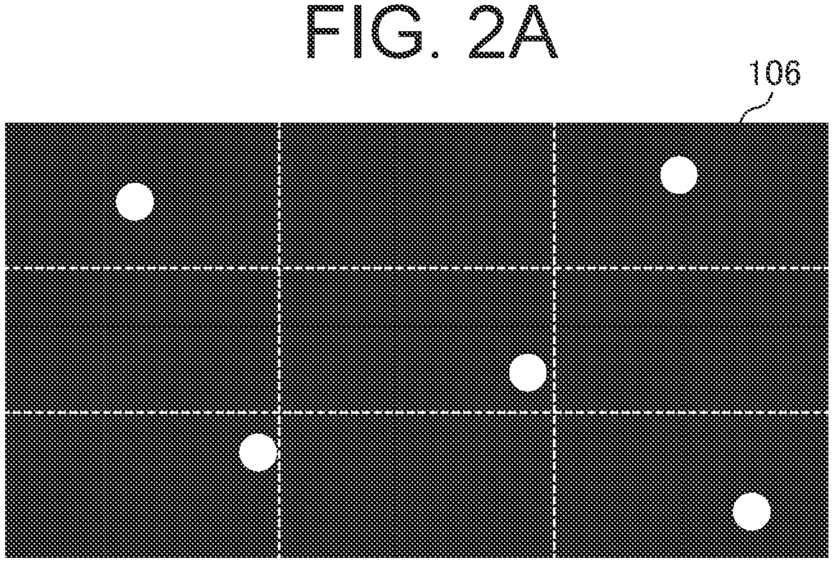
FIG. 2A is a schematic diagram illustrating a video image on a display of a television receiver according to the first embodiment.
Figure 2B:
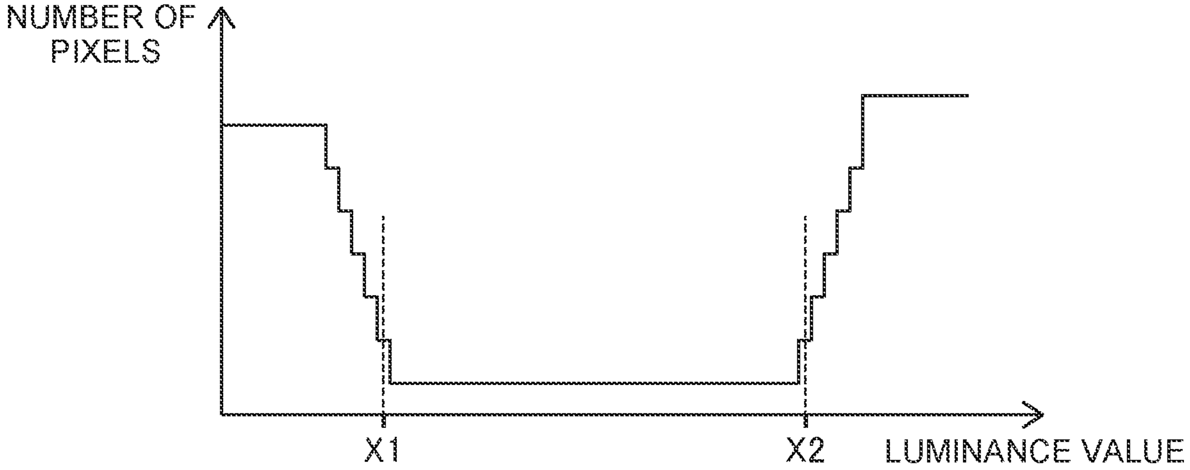
FIG. 2B is a histogram of luminance values of the video image illustrated in FIG. 2A.

FIG. 2A illustrates an example screen when a video image of a starry sky is displayed on the display 106. As illustrated, several regions display bright, small dots, while other regions are almost black. FIG. 2B is a luminance histogram corresponding to FIG. 2A. As illustrated, for a video image such as a starry sky, the histogram is bisected into regions of low luminance and high luminance, with little luminance in-between. In the subsequent luminance histograms, including FIG. 2B, the horizontal axis represents luminance increasing in the direction of the arrow, and the vertical axis represents the number of pixels increasing in the direction of the arrow.

Accordingly, the scene determiner 111 first checks the lighting rate of the entire backlight 107. That is, the scene determiner 111 checks the percentage of lit areas among the (3×3)=9 areas L1 to L9 in the backlight 107. The scene determiner 111 then determines whether or not the lighting rate is equal to or larger than a prescribed value set in advance. This is because, when stars are scattered throughout the video image, as illustrated in FIG. 2A, the lighting rate of the backlight should be a certain level or higher in order to make the stars shine brightly.

The scene determiner 111 continues to determine whether or not the percentage of regions of high luminance, i.e., regions corresponding to video images of stars, to the total screen is a certain level or higher. This is because if the stars are scattered, there should be more than a certain number of regions of high luminance, as illustrated in the histogram in FIG. 2B. Moreover, the scene determiner 111 determines whether or not the percentage of regions of low luminance, i.e., regions corresponding to dark, to the total screen is a certain level or higher. This is because, in the case of a video image of a starry sky, most of the regions should be of low luminance, as illustrated in the histogram in FIG. 2B.

When the backlight lighting rate is a certain level or higher, the percentage of the high luminance regions to the entire screen is a certain level or higher, and the percentage of the low luminance regions to the entire screens is a certain level or higher, the scene determiner 111 determines that the input video image is a video image of a starry sky, as illustrated in FIGS. 2A and 2B.

Figure 3A:
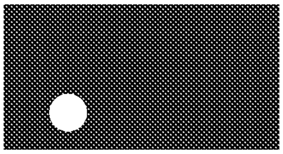
FIG. 3A is a schematic diagram illustrating a gradation distribution of one area on the display of a television receiver according to the first embodiment.

When the scene determiner 111 determines that the input image is of a video image of a starry sky, the parameter setter 112 sets the backlight gradation to a higher level. More specifically, the percentage α of the maximum luminance to the average luminance in each area is increased. This percentage α is explained using FIGS. 3A and 3B. FIG. 3A illustrates the gradation distribution of an area L in the display 106, and FIG. 3B schematically illustrates a method of determining the backlight gradation in the area.

In the example illustrated in FIG. 3A, in the area, the white dot region is bright and has the maximum luminance, while the other regions have almost the lowest luminance. The backlight gradation of the area is determined on the basis of both the maximum luminance of the area, i.e., the luminance value of the white dot region illustrated in FIG. 3A, and the average luminance of the area, i.e., the average luminance of all areas including the luminance value of white dot region illustrated in FIG. 3A and almost the lowest luminance values in the other regions. This is schematically illustrated in FIG. 3B.

Figure 3B:
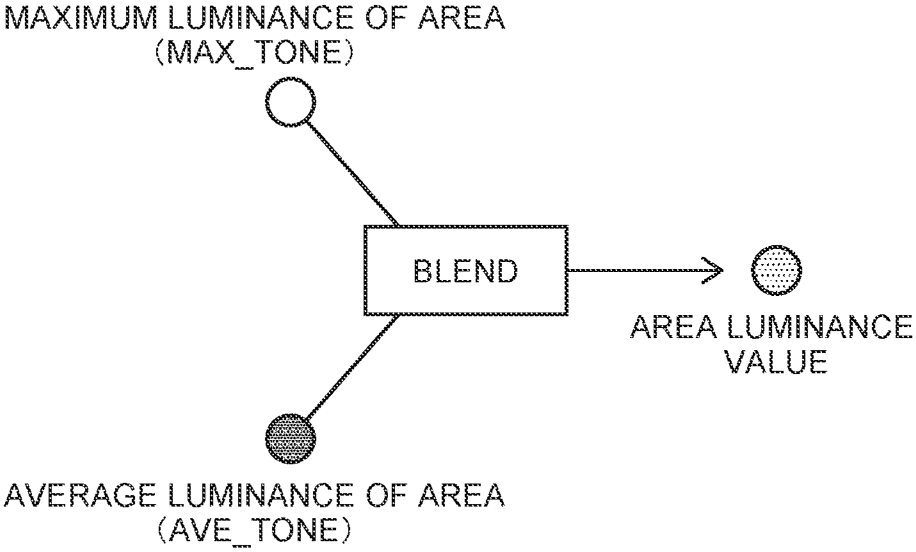
FIG. 3B is a schematic diagram illustrating the concept of a method of determining a backlight gradation in the television receiver according to the first embodiment.

As illustrated in FIG. 3B, the backlight gradation in the area is obtained by mixing the maximum luminance of the area and the average luminance of the area. Such mixing may also be referred to as, for example, blending. The ratio when blending is the above percentage α. Therefore, the luminance value (backlight gradation) of the area can be expressed by the following equation (1) by using the percentage α.

$$\alpha\times(\text{MAX\_TONE})+(1-\alpha)\times(\text{AVE\_TONE}) \quad (1)$$

However, (MAX_TONE) is the maximum luminance of the area, and (AVE_TONE) is the average luminance of the area.

As represented by equation (1) above, increasing the percentage α increases the luminance value of the area. When the parameter setter 112 determines that the input image is a video image of a starry sky, this percentage α is increased. For example, it is set to the maximum value that can be set. The local dimming controller 113 then controls the backlight 107 on the basis of the set percentage α. As a result, the area is brightly illuminated by the backlight 107, and the stars on the display 106 appear to shine brightly. The percentage α set by the parameter setter 112 is applied to all areas L1 to L9 in the backlight 107. That is, the percentage α is a common value for all areas.

Note that (MAX_TONE) is not necessarily limited to the maximum luminance in the area. For example, the luminance value should be a predetermined value or larger. That is, the percentage α can be defined as the ratio of the luminance value equal to or larger than a predetermined value in each of the multiple areas to the average luminance value in the area in interest.

Figure 4:
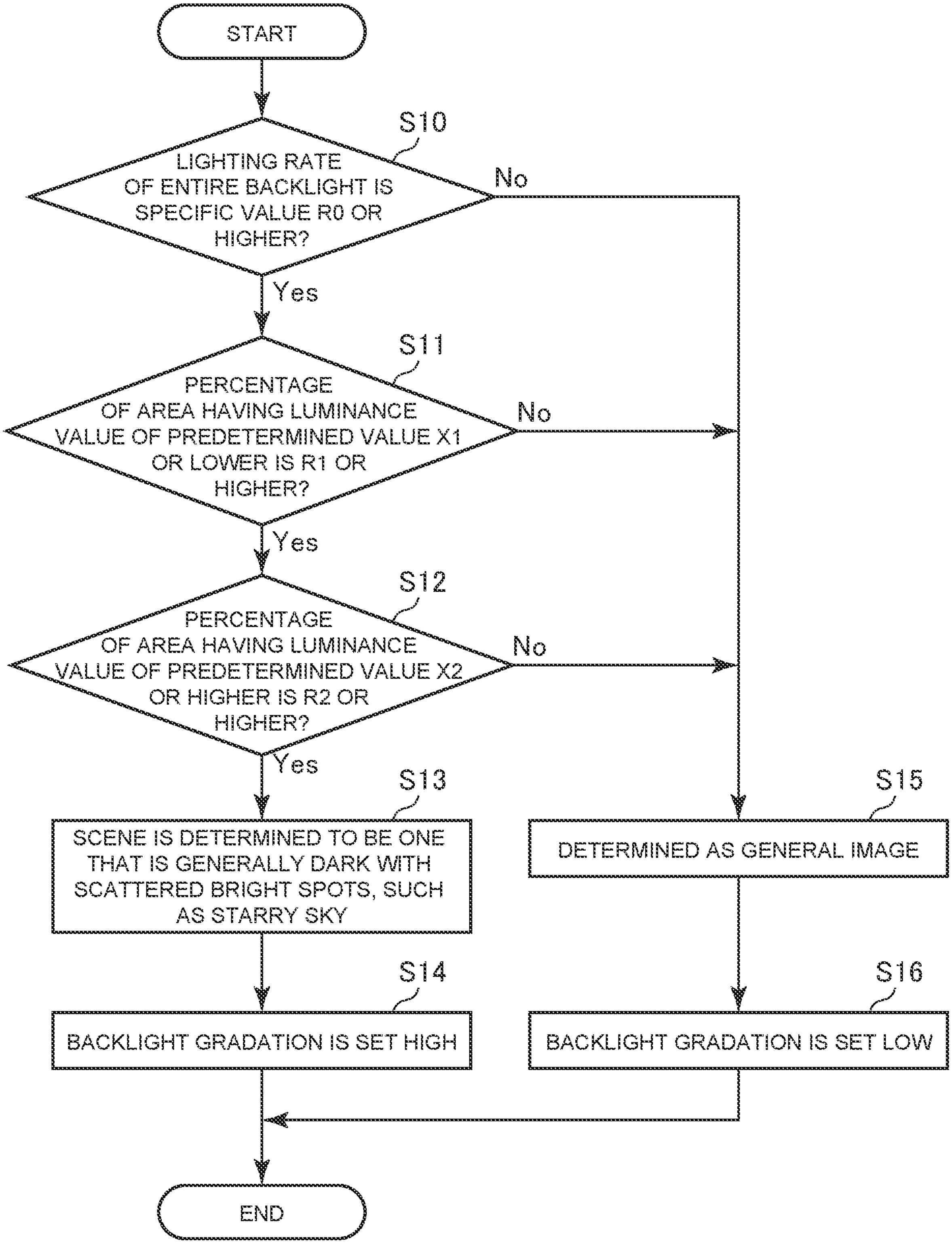
FIG. 4 is a flowchart of an example of a flow of a television process according to the first embodiment.

FIG. 4 is a flowchart illustrating the scene determination method explained with reference to FIGS. 2A, 2B, 3A, and 3B above and the process flow of the method of controlling the backlight on the basis of on the scene determination results.

As illustrated, first, in step S10, the scene determiner 111 checks the lighting rate of the entire backlight 107. That is, in the example illustrated in FIG. 1, the scene determiner 111 determines whether or not the percentage of lit areas out of the (3×3)=9 areas L1 to L9 in the backlight 107 is equal to or larger than the predetermined prescribed value R0. The prescribed value R0 can be appropriately selected in accordance with the scene to be determined and may be set to, for example, 60% to 80% in the case of a video image of a starry sky. However, the prescribed value R0 may be based on the number of areas in the backlight as well as the scene. That is, in the case of a video image of a starry sky, the larger the number of areas, i.e., the smaller the area of one area, the smaller the prescribed value R0 can be made. This is because the larger the number of areas, more likely regions will not contain stars.

Next, in step S11, the scene determiner 111 determines whether or not the percentage of regions having a luminance value of a predetermined value X1 (first luminance value) or lower is R1 or higher. This step corresponds to the determination of whether or not the percentage of low luminance regions, i.e., dark regions, exceeds a certain level, as described with reference to the histogram in FIG. 2B. The predetermined value X1 is therefore a value that can identify regions having a luminance value of X1 or smaller as dark, as illustrated in FIG. 2B. In the case of a video image of a starry sky, since a significant region should be dark, the percentage R1 can be set to a relatively high value, e.g., 70% to 90%.

Next, in step S12, the scene determiner 111 determines whether or not the percentage of regions having a luminance value of a predetermined value X2 (second luminance value) or higher is R2 or lower. This step corresponds to the determination of whether or not the percentage of high luminance regions, i.e., starry regions, exceeds a certain level, as described with reference to the histogram in FIG. 2B. The predetermined value X2 is therefore a value that can identify regions having a luminance value of X2 or larger as stars, as illustrated in FIG. 2B. In the case of a video image of a starry sky, since a significant region should be dark, the percentage R2 can be set to a relatively low value, e.g., 10% to 30%. Therefore, the relationship X2>X1 is valid for the luminance value, and R1>R2 is valid for the percentage of the regions.

When all of the conditions in steps S10, S11, and S12 are satisfied, the scene determiner 111 determines in step S13 that the input image is of a scene such as a starry sky that is generally dark but dotted with bright spots. Then, in step S14, the parameter setter 112 sets the percentage α to a larger value. The backlight gradation is then set higher by the local dimming controller 113, and the display 106 is brightly illuminated by the backlight 107. This step is as explained earlier with reference to FIGS. 3A and 3B.

On the other hand, when a condition is not satisfied in any of steps S10, S11, and S12, then in step S15, the scene determiner 111 determines that the input image is not of a scene of a starry sky but a general video image. In this case, the parameter setter 112 sets the percentage α to a smaller value than in step S14. In this case, the percentage α is set to a value adjusted by default, for example, a value where the percentage of the maximum luminance and the average luminance is set to 50% each (α=0.5). Of course, this is not limited to such a case, and the α values can be selected from various values but is set to a value lower than that in the case of a scene of a starry sky. Then, the backlight gradation is set lower by the local dimming controller 113.

As described above, in the present embodiment, the scene determiner 111 determines a scene of an input video image on the basis of luminance distribution of the input video image and the lighting rate of the backlight 107. Then, the parameter a is determined for setting the gradation of the entire area of the backlight 107 (for example, raising or lowering the overall gradation) on the basis the scene determined by the scene determiner 111. The local dimming controller 113 then uses this parameter a to control local dimming, so that, for example, the entire scene is dark, but bright areas such as stars are lit with light having higher luminance. This enables optimal local dimming in accordance with the scene.

Second Embodiment

Next, the second embodiment will be described. The present embodiment relates to the case where an overall bright (high luminance) scene is detected instead of a scene of a starry sky as in the first embodiment. In the following, difference from the first embodiment will be described.

An overview of a scene determination method for an input video image and a backlight control method based on a result of scene determination according to the present embodiment will be described. The scene determiner 111 according to the present embodiment determines an overall bright scene as an example of a scene.

Figure 5A:
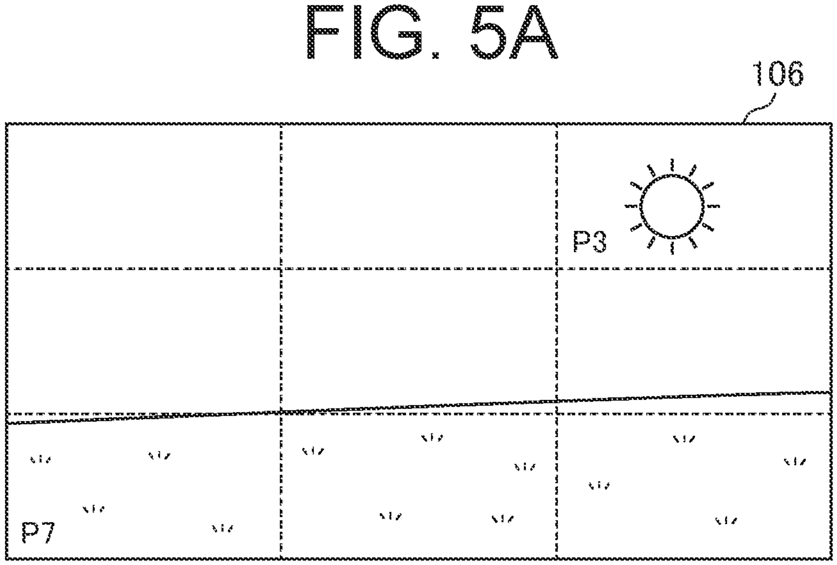
FIG. 5A is a schematic diagram illustrating a video image on a display of a television receiver of a second embodiment.
Figure 5B:
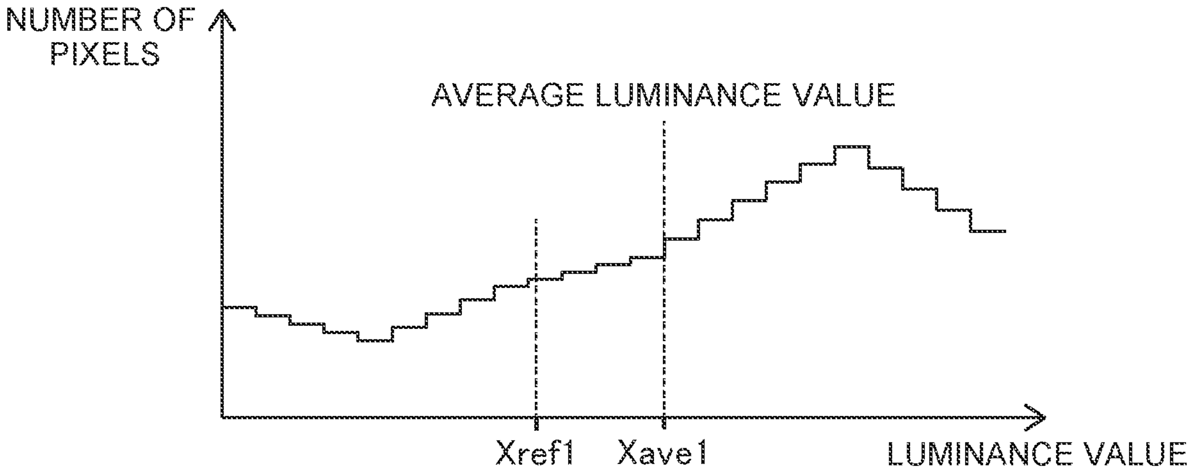
FIG. 5B is a histogram of luminance values of the video image illustrated in FIG. 5A.

FIG. 5A illustrates an example screen when an overall bright scene is displayed in the display 106. In the example illustrated in FIG. 5A, a hill is displayed in the foreground and a blue sky and sun are displayed in the background. An area P3, where the sun is displayed, has particularly high luminance. Meanwhile, an area P7, where the hill is displayed, has luminance lower than the other areas due to, for example, shadow reflection. FIG. 5B is a luminance histogram corresponding to FIG. 5A. As illustrated, unlike the case of FIGS. 3A and 3B described in the first embodiment, pixels are widely distributed across regions of low to high luminance values. Then, the number of pixels is relatively high in the region of high luminance values. In this example, the average luminance value in the entire video image displayed on the display 106 is Xave1, as illustrated in FIG. 5B.

Figure 6:
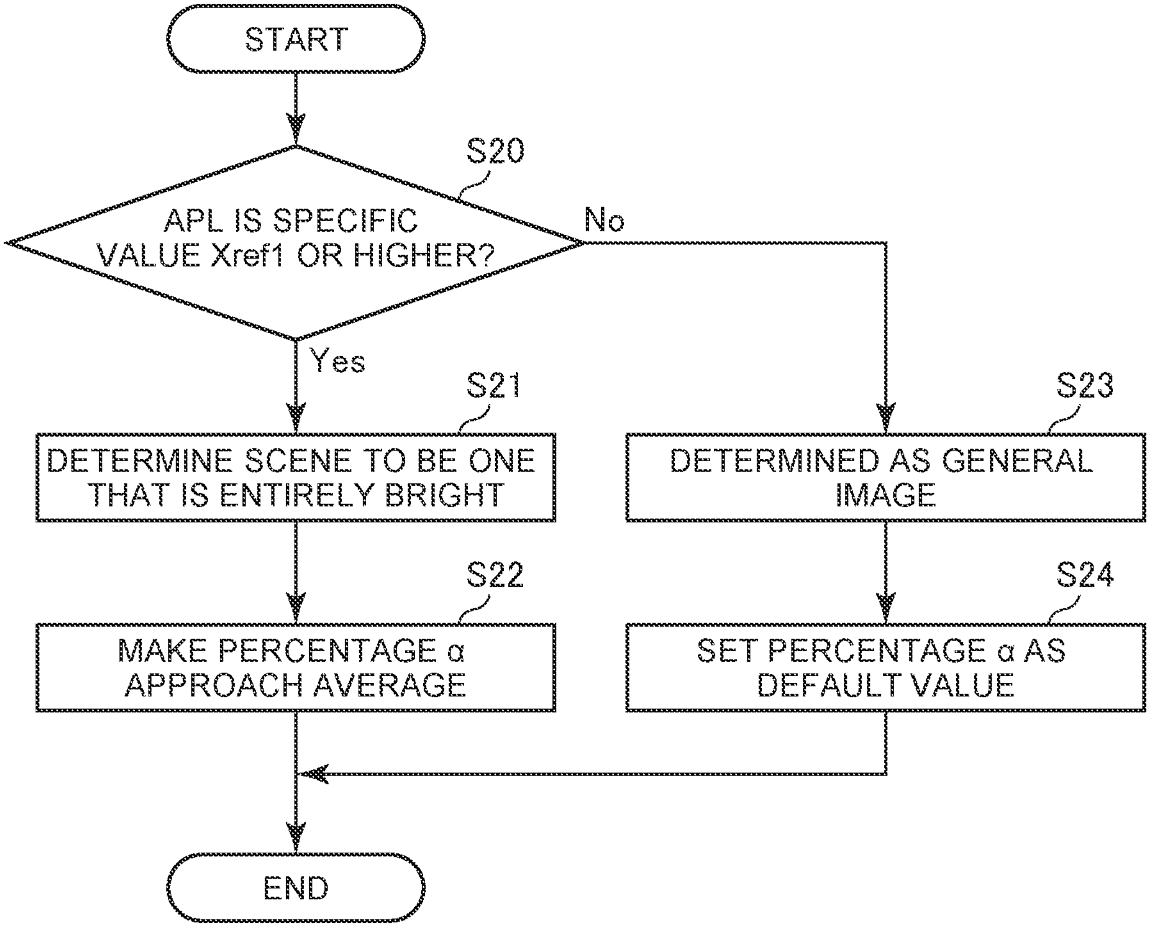
FIG. 6 is a flowchart of an example of a flow of a television process according to the second embodiment.

FIG. 6 is a flowchart illustrating the scene determination method explained with reference to FIGS. 5A and 5B above and the process flow of the method of controlling the backlight on the basis of on the scene determination results. The present embodiment differs from the first embodiment described with reference to FIG. 4 in that the scene determiner 111 does not consider the lighting rate of the backlight 107 when performing scene determination. In the present embodiment, the scene determiner 111 performs scene determination on the basis of the average luminance level (APL: Average Picture Level) of the input image.

As illustrated in FIG. 6, first, in step S20, the scene determiner 111 determines whether or not the APL of the input video image is higher than or equal to a prescribed value Xref1 determined in advance. For example, in the example in FIG. 5B, the average luminance value Xave1 corresponds to the APL, and Xave1 is larger than Xref1. The prescribed value Xref1 can be set in accordance with the brightness of a desired scene. If the value of Xref1 is set to a small value, even a relatively dark scene is determined to be a bright scene overall. Conversely, if Xref1 is set to a large value, the scene is not determined to be bright unless the APL is significantly high.

If the APL is larger than or equal to the prescribed value Xref1 in step S20, the scene determiner 111 determines in step S21 that the input image is of an overall bright scene. Then, in step S22, the parameter setter 112 sets the percentage α to a value closer to the average. That is, the contribution of the average luminance value (AVE_TONE) is increased in Equation (1) and FIG. 3B described in the first embodiment. More specifically, the percentage α is set to a relatively small value, e.g., approximately 0.3 to 0.4. Of course, the percentage α is not limited to these values, and may be larger or smaller. The local dimming controller 113 then controls the backlight 107 by using the set percentage α.

Meanwhile, if the APL is lower the prescribed value Xref1 in step S20, the scene determiner 111 determines in step S23 that the input image is a general video image, not an overall bright scene. Then, in step S24, the parameter setter 112 sets the percentage α to, for example, a default value. This process is similar to step S16 explained in the first embodiment. In this case, for example, the percentage α (e.g., 0.5) set in step S24 is larger than the percentage α set in step S22. The local dimming controller 113 then controls the backlight by using the set percentage α.

According to the present embodiment, if the input video image is of an overall bright scene, the percentage α is set lower than that of when the input video image is not. By setting a low percentage α, the backlight gradation is set to be relatively dark. This influence is more pronounced in the low- and mid-gradation regions in the video image, where the luminance in these regions is relatively low. On the other hand, even if the same percentage α is used, the influence of a lower percentage α setting in the high-gradation regions is small, and the luminance in these regions remains high. Since the luminance values in the low- and mid-gradation regions can be small, the power used in these regions is suppressed. Therefore, the local dimming controller 113 can use the power suppressed in the low- and mid-gradation regions for the high-gradation regions. More specifically, using this power in high-gradation regions can further increase the luminance of these regions. As a result, the luminance values in low- and medium-gradation regions can be low, while those in high-gradation regions can be high, thus increasing the contrast of the video image.

Third Embodiment

Next, the third embodiment will be described. In the present embodiment, when the input video image is determined to be of a scene of a starry sky in the first embodiment described above, the density of brighter regions is determined and the percentage α is determined in accordance with the result. In the following, difference from the first embodiment will be described.

Figure 7A:
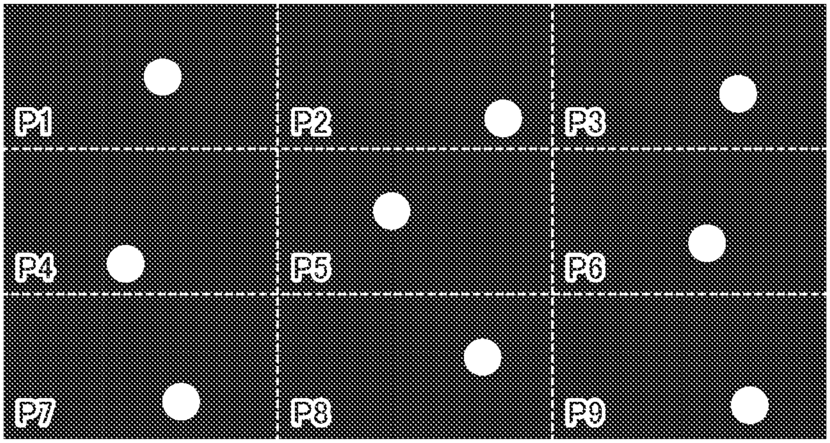
FIG. 7A is a schematic diagram illustrating a video image on a display of a television receiver according to a third embodiment.
Figure 7B:
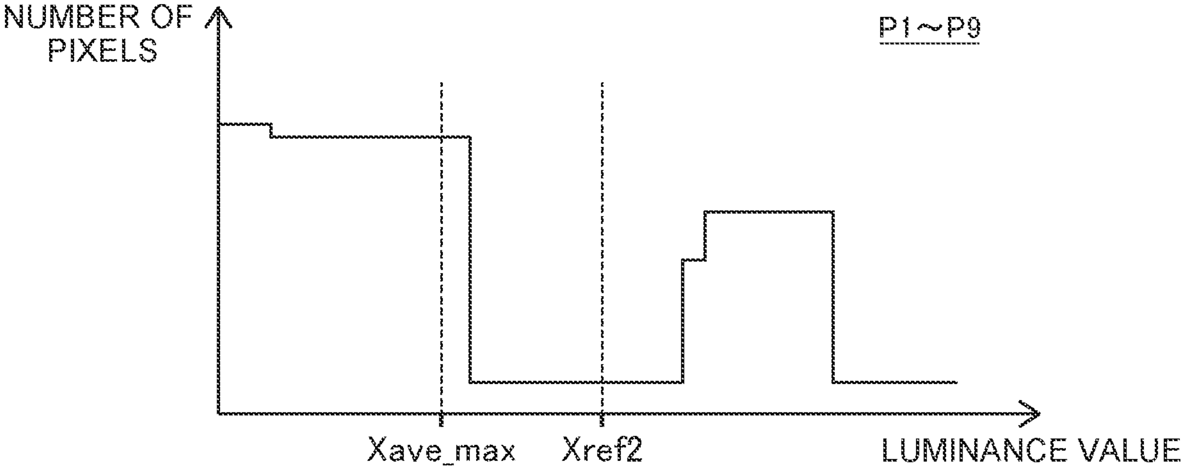
FIG. 7B is a histogram of luminance values for the video image illustrated in FIG. 7A.

When the process described with reference FIG. 4 of the first embodiment is executed, the following two cases could determine a scene of starry sky. The first case is illustrated in FIGS. 7A and 7B. FIG. 7A illustrates an example screen displayed on the display 106, and FIG. 7B is a luminance histogram of each of the areas P1 to P9 in FIG. 7A.

As illustrated in FIG. 7A, in this case, the overall image is dark, but the bright regions that are stars are evenly distributed throughout the areas P1 to P9. In this case, the luminance histograms of each of the areas P1 to P9 all have the shape illustrated in FIG. 7B. That is, the number of pixels having low luminance is very high, and the number of pixels having high luminance is very low.

Figure 8A:
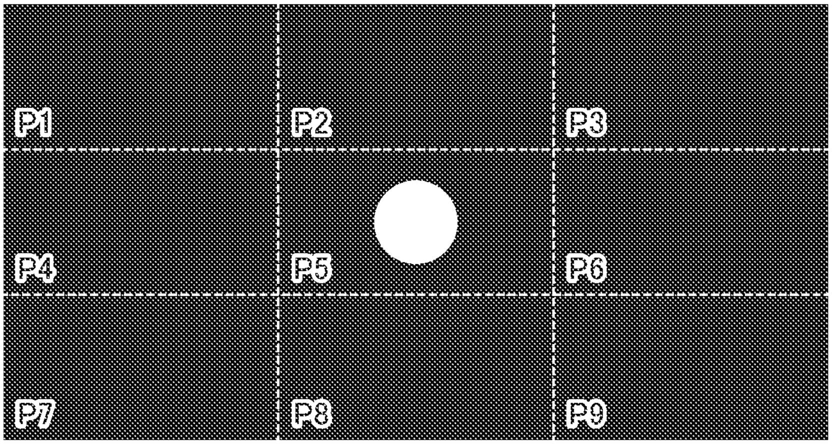
FIG. 8A is a schematic diagram illustrating a video image on a display of a television receiver according to the third embodiment.
Figure 8B:
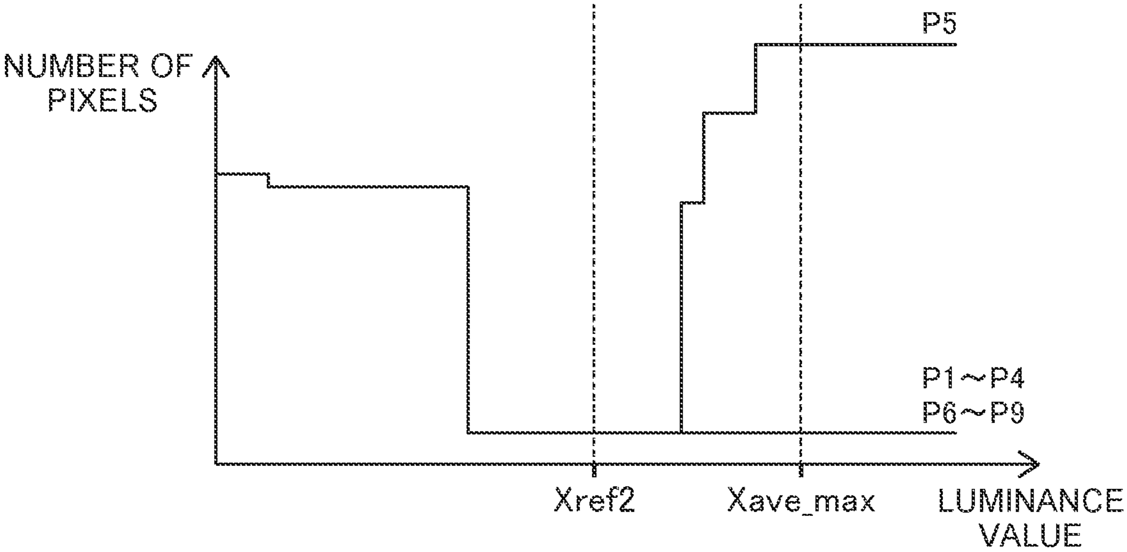
FIG. 8B is a histogram of luminance values for the video image illustrated in FIG. 8A.

The next case is the scene illustrated in FIGS. 8A and 8B. FIG. 8A illustrates an example screen displayed on the display 106, and FIG. 8B is a luminance histogram of each of the areas P1 to P9 in FIG. 8A.

As illustrated in FIG. 8A, in this case, as in FIG. 7A, the overall image is dark, but the bright regions that are stars are only concentrated in the area P5. This case applies, for example, to a video image of the moon captured using a telephoto lens. In this case, as illustrated in FIG. 8B, the luminance histograms of the areas P1 to P4 and P6 to P9 contain only pixels having low luminance, and even if small stars were present, the number of pixels is as small as illustrated in FIG. 7B. In contrast, the luminance histogram of the area P5 shows a very large number of pixels having high luminance.

Figure 9:
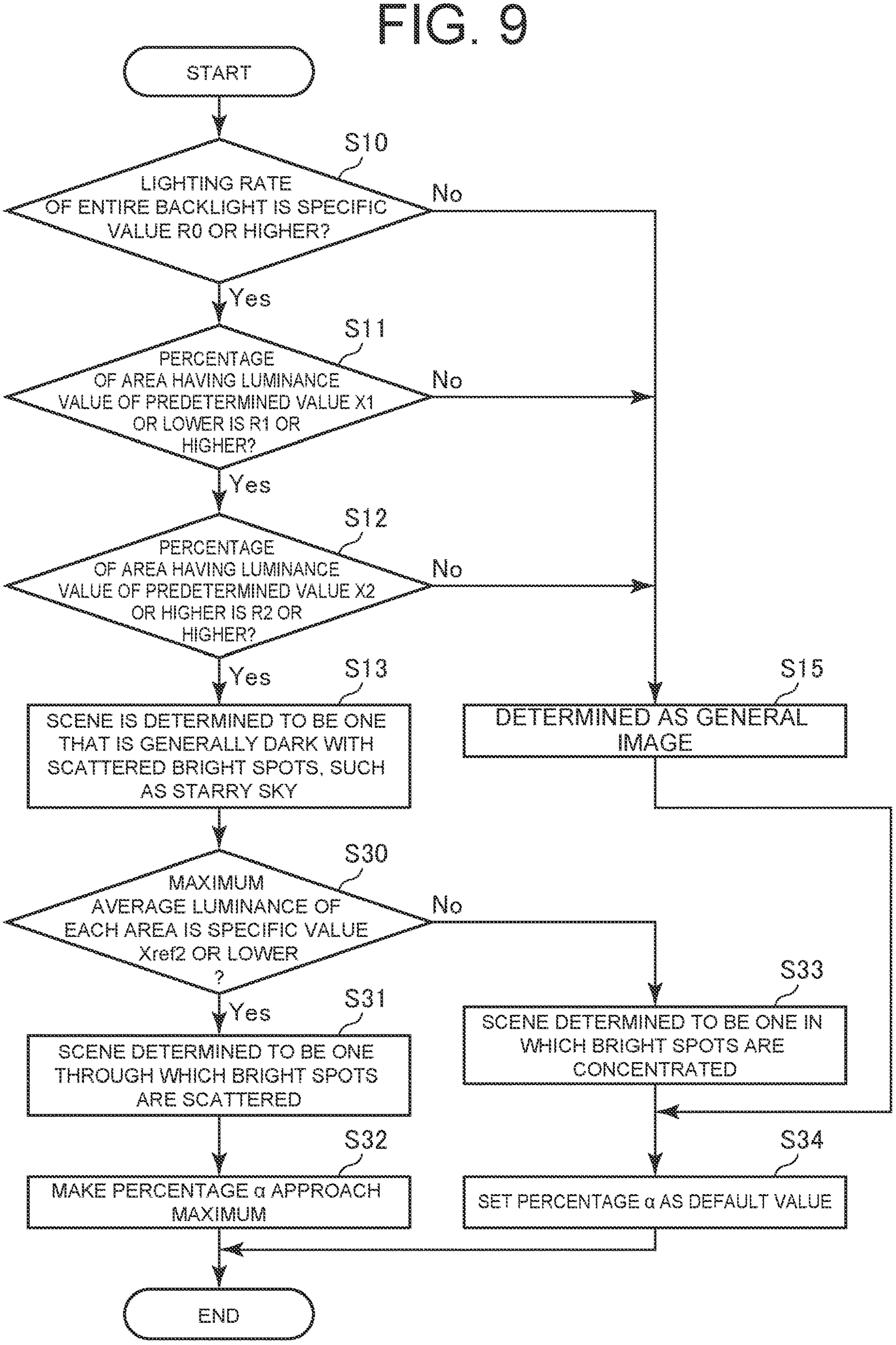
FIG. 9 is a flowchart of an example of a flow of a television process according to the third embodiment.

The present embodiment uses different percentages a for the case of FIG. 7A and the case of FIG. 8A, as described above. FIG. 9 is a flowchart illustrating the process flow of the scene determination method according to the present embodiment and the backlight control method based on the results of the scene determination. The flowchart corresponds to FIG. 4 described in the first embodiment.

As illustrated in FIG. 9, steps S10 to S13 and S15 described with reference to FIG. 4 of the first embodiment are performed first. If the scene determiner 111 determines in step S13 that the input video image is of a scene of a starry sky, the scene determiner 111 continues to determine in step S30 whether or not the maximum value of the average luminance of each area in the input video image is equal to or smaller than a prescribed value Xref2 (third luminance value) determined in advance.

The third luminance value is decided by how concentrated the lit regions are concentrated in one area in order to determine that the scene contains concentrated bright spots as illustrated in FIG. 8A. For example, when it is determined that bright spots are concentrated in a case where (XX) % or more of the lit regions of the entire screen are concentrated in one area by using the number of areas and the APL of the entire screen, the third luminance value can be decided, for example, by the following Equation (2). XX is a value between 0 and 100.

$$\text{Xref2}=(\text{APL of entire screen})\times(\text{number of areas}\times(\text{XX})/100) \qquad (2)$$

However, the method of deciding the third luminance value is not limited to this method and may be determined by any other method.

For example, when a case where lit regions are concentrated in one area, as in FIG. 8A is assumed as "bight regions being concentrated", the value of XX in equation (2) above is, for example, 100. Therefore, the value of Xref2 is ((APL of entire screen)×9). In this regard, in the examples in FIGS. 7A and 7B, the maximum value of the average luminance of each area is relatively low because only a few small stars reside in each area. Then, as illustrated in FIG. 7B, the maximum value of the average luminance of each of the areas P1 to P9 is Xave_max indicated in the drawing, which is smaller than the prescribed value Xref2. Therefore, in this case, in step S31, the scene determiner 111 determines that the scene is a scene with sparse bright spots, i.e., a scene as illustrated in FIG. 7A. Subsequently, as in step S14 explained in the first embodiment, in step S32, the parameter setter 112 sets the percentage α to be near maximum, and the local dimming controller 113 sets the luminance of the backlight to be high to illuminate the display 106.

On the other hand, in the example of FIGS. 8A and 8B, since bright regions are concentrated in the area P5, the maximum value of the average luminance of the area P5 is relatively high. In the example of FIG. 8B, the maximum value of the average luminance of each of the areas P1 to P4 and P6 to P9 is, for example, the same as that in FIG. 7B, but the maximum value of the average luminance of the area P5 is Xave_max shown in the drawing, which is larger than the prescribed value Xref2. Therefore, in this case, in step S33, the scene determiner 111 determines that the scene is a scene with concentrated bright spots, i.e., a scene as illustrated in FIG. 8A. Subsequently, as in step S16 explained in the first embodiment, in step S34, the parameter setter 112 sets the percentage α to a default value, e.g., 0.5, and the local dimming controller 113 sets the luminance of the backlight to a default value to illuminate the display 106.

According to the present embodiment, it is further determined in the first embodiment whether or not the bright regions are concentrated. If bright regions are concentrated, sufficient luminance can be achieved without increasing the backlight gradation. Thus, power consumption can be reduced.

Modifications

As described above, the display device and its control method according to the first to third embodiments enable optimal local dimming control in accordance with the result of the determining the scene of an input video image. The embodiments are not limited to those described above, and various modifications are possible. Each embodiment may be implemented independently, or multiple embodiments may be implemented in combination.

For example, in the second embodiment described above, when the input video image is of an overall bright scene, the blur effect on a target may be reduced by turning on the backlight around the high luminance region. Hereafter, this process of blurring a target is referred to simply as "blurring". Blurring will be explained briefly with reference to FIG. 10.

Figure 10:
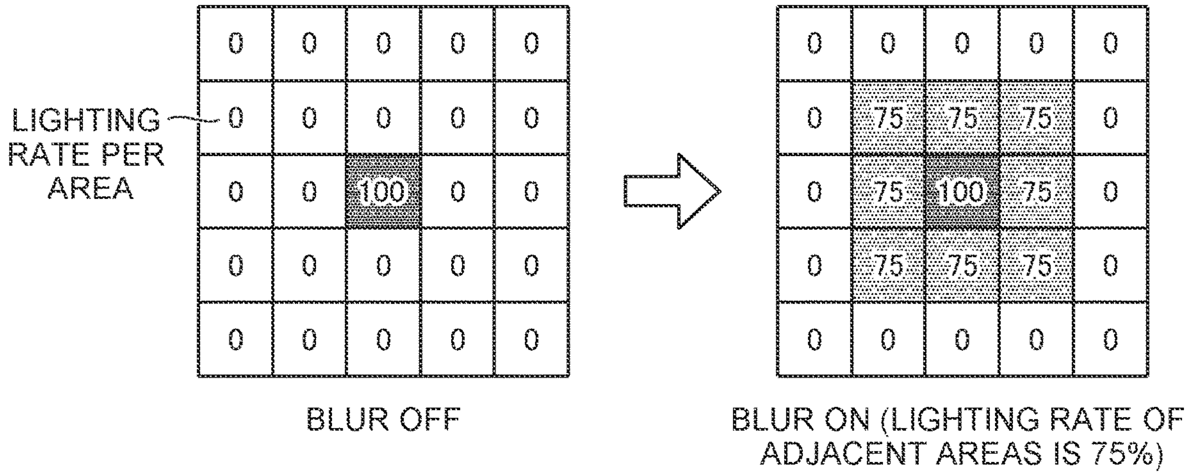
FIG. 10 is a schematic diagram illustrating the concept of blur used in a television receiver according to a modification of the first to third embodiments.

FIG. 10 is a schematic diagram of the backlight 107 that contains (5×5)=25 areas, with the intensity of the irradiated light adjustable for each area, and the numbers in each area indicate the lighting rate for that area. The left section of FIG. 10 illustrates the case where blur is turned off, and, for example, only the center area of the backlight 107 is lit with a lighting rate of 100%. In contrast, the right section of FIG. 10 illustrates the case where the blur is turn on. In this example, eight areas located adjacent to and around the area having a lighting rate of 100% in the left section of FIG. 10 are lit with a lighting rate of, for example, 75%. Which area is newly lit and its lighting rate can be selected appropriately, for example, by the parameter setter 112 or the local dimming controller 113.

As explained above, blur is a function of expanding the lit area by turning on the backlight in areas adjacent to the lit area. When the blur is made stronger, that is, when the number of lit areas is increased and/or the lighting rate of the lit areas is increased, the contrast between light and dark is reduced, but the adverse effects of extreme luminance differences are less noticeable. Such an adverse effect is a phenomenon in which, when a target is displayed with high luminance and the surrounding luminance is very low, the periphery of the target, i.e., the region having an extreme luminance difference, appears darker to the viewer than the other regions, such as the center of the target. On the other hand, when the blur is weakened, that is, when the number of lit areas is increased less and/or the lighting rate of lit areas is reduced, the contrast between light and dark increases, although conversely the adverse effects are more noticeable.

Figure 11:
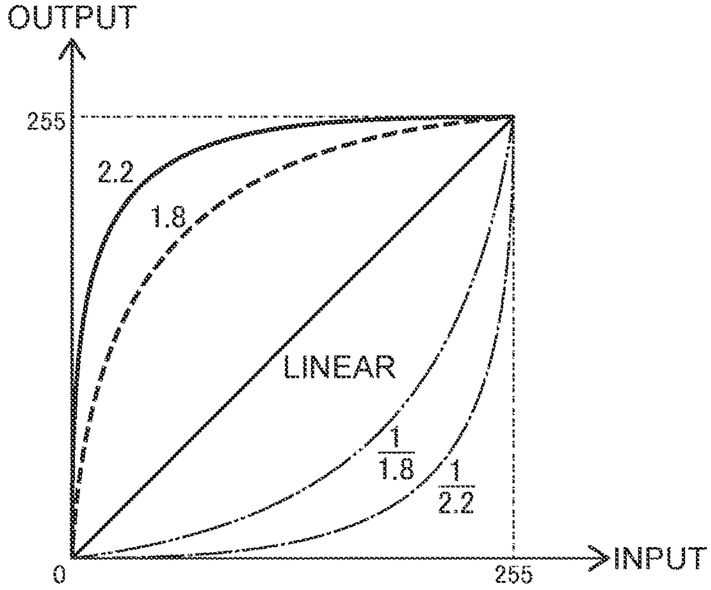
FIG. 11 is a schematic diagram illustrating the concept of backlight gamma used in a television receiver according to a modification of the first to third embodiments.

In the second embodiment described above, when the input video image is of a generally a bright scene, the correction strength of gamma correction may be decreased. In other words, the correction may be made such that the middle value is smaller in the luminance distribution of the backlight. FIG. 11 illustrates the luminance curve of the backlight, where the horizontal axis is the input (before correction) luminance value and the vertical axis is the output (after correction) luminance value, with luminance values distributed from zero (black) to 255 (white); the larger the luminance value, the brighter the light.

As illustrated, the distribution of outputs with respect to inputs can be expressed by Equation (3) below.

$$y=255\times(x/255)^{(1/\gamma)} \quad (3)$$

where, y is the output (luminance value after correction), x is the input (luminance value before correction), γ is the γ correction value. In this case, the minimum luminance value is zero and the maximum luminance value is 255. For example, if γ is 1, the input luminance value is the same as the output luminance value, and the input and output have a linear relationship. In contrast, if γ is a value larger than one, the luminance curve has an upward convex shape, and the output luminance value is larger than the input luminance value due to the correction. In other words, the luminance value of the backlight 107 is larger than the input value, and the display 106 is illuminated with brighter light. In contrast, if γ is a value smaller than 1, the luminance curve has a downward convex shape (concave shape), and the output luminance value is smaller than the input luminance value due to the correction. That is, the luminance value of the backlight 107 is smaller than the input value. Such gamma correction may be performed by, for example, the parameter setter 112 or the local dimming controller 113 to control the backlight 107. The local dimming controller 113 then sets γ to a small value near 1 for the video image illustrated in FIG. 5A, and sets the overall color tone of the video image darker. This allows for a stronger contrast between bright and dark regions.

Figure 12:
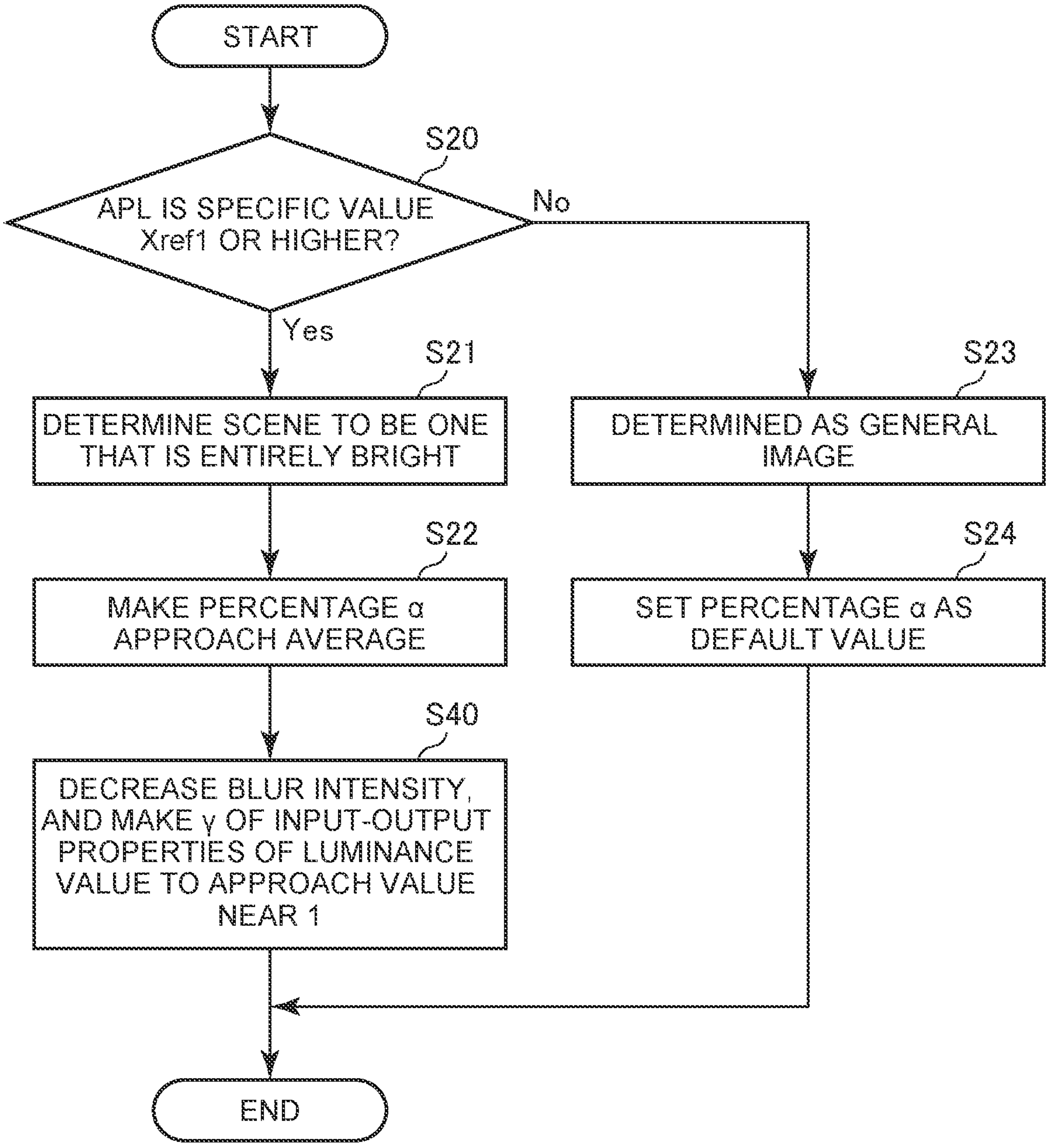
FIG. 12 is a flowchart of an example of a flow of a television process according to the modification of the first to third embodiments.

FIG. 12 is a flowchart illustrating the process flow of the backlight control method when the blur and gamma correction described above with reference to FIGS. 10 and 11 are applied, and corresponds to FIG. 6 described in the second embodiment. As illustrated, after processes in steps S20 to S22 described with reference to FIG. 6, in step S40, for example, the parameter setter 112 or local dimming controller 113 reduces the intensity of the blur in the backlight 107 or turns off the blur, and also corrects the luminance value of the input video image by setting by setting the γ value near 1, for example, in the range of (1/1.2) to 1.2 in the luminance curve described with reference to FIG. 11. Of course, the γ value may be adjusted outside of this setting. Although not illustrated in FIG. 12, when the input video image is determined in step S23 to be a general video image, the blur of the backlight 107 may be set to be stronger than that in step S40, or the luminance value of the input video image may be set to be larger than linear in the luminance curve described with reference to FIG. 11, i.e., upward convex, and larger than that in step S40, to correct the luminance value. Alternatively, γ may be less than 1 as long as it is larger than that in step S40. These values may be preset, for example, as default values.

The first and third embodiments describe examples of a video image of a starry sky. However, a scene in which bright regions are scattered throughout an overall dark video image may be, for example, a video image of fireflies, or a night scene in which the light from the windows of buildings and other structures is scattered. In the embodiments described above, a scene of a starry sky and an overall bright scene are described as examples. However, the scenes to be determined by the scene determiner 111 are not limited to these, and the scene determiner 111 may retain the features of various scenes in advance and change the reference values X1, X2, Xref1, and Xref2 of the pixel values of the input video image and the values of the lighting rate R0 of the regions R1 and R2 and the backlight 107 having specific pixel values on the basis of these features, and further, the scene determination can be performed on the basis of the features in the distribution of pixel values as a whole video image, the average luminance level, etc. The parameter setter 112 may retain various setting values in advance for each scene that can be determined by the scene determiner 111. Examples of setting values are not limited to percentage α, blur, and gamma correction value, but any parameter related to brightness of the display 106. These reference values for determining scenes (e.g., the prescribed values R0 to R2 and the luminance values X1, X2, etc. in FIG. 4) can be retained in a storage device, such as ROM or RAM, of the television receiver 100, which is not illustrated in FIG. 1. Of course, for example, the processor 101 or processor device may perform various calculations in accordance with the scene to be determined and calculate the reference values necessary for scene determination.

Furthermore, in the above embodiments, image quality may be adjusted in accordance with content type. That is, in multiplexed broadcast waves, genre information indicating the content type of a program is transmitted together with the video image data of the program. In this case, for example, the parameter setter 112 of the television receiver 100 determines the basic image quality adjustment (backlight adjustment) in accordance with the content type, and the method explained in the first to third embodiments above and the modifications may be used as the standard for this basic image quality adjustment. For example, even for the same scene of a starry sky, the prescribed values R0 to R2 and the predetermined values X1 and X2 may be different when the program content type is, for example, a movie or a documentary. In some cases, the processes in steps S14 and S16 may be interchanged in FIG. 4. This is also the same for the second and third embodiments.

The present disclosure is not limited to each of the above-described embodiments, and various modifications may be made thereto within the scope indicated by the claims. An embodiment that can be implemented by appropriately combining technical sections disclosed in the different embodiments also falls within the technical scope of the present disclosure. Furthermore, new technical features can be created by combining the technical sections disclosed in the embodiments. The order of the processes in the flowcharts described in the embodiments described above can be interchanged as much as possible.

The programs that realize the functions of the embodiments are stored in a non-transitory recording medium, such as a semiconductor medium, an optical recording medium, or a magneto-optical recording medium. For example, a non-volatile memory card or the like may be used as the semiconductor medium. A CD (Compact Dick) or a DVD (Digital Versatile Disk) may be used as the optical recording medium and the magneto-optical recording medium. Furthermore, the above program may be supplied to a computer via any transmission medium capable of performing transmission.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device comprising:

a display panel that displays an image;

a backlight that illuminates the display panel by irradiating the display panel with light;

a scene determiner that determines a scene of an input video image based on a luminance distribution of the input video image and a lighting rate of the backlight;

a parameter setter that sets a parameter related to a luminance value applied to a plurality of areas of the backlight based on the scene determined by the scene determiner; and a local dimming controller that controls a local dimming of the backlight for each of the plurality of areas based on the set parameter, wherein the parameter setter decides a ratio of the luminance value of each of the plurality of areas to an average luminance value of each of the plurality of areas in accordance with the determined scene, the luminance value being equal to or larger than a predetermined value, and sets the parameter applied to each of the plurality of areas using the decided ratio, and wherein the parameter setter further determines the parameter by increasing a ratio of a luminance value, which is equal to or larger than the predetermined value, to be larger than a ratio of the average luminance value when:

the scene determiner determines that the input video image is of a scene comprising a dark background having a luminance value equal to or smaller than a first luminance value and a bright region having a luminance value equal to or larger than a second luminance value, which is larger than the first luminance value, and in the scene, a ratio of an area having the luminance value equal to or smaller than the first luminance value is greater than a ratio of an area having the luminance value equal to or larger than the second luminance value.

2. The display device according to claim 1, wherein the parameter having a same value is applied to each of the plurality of areas of the backlight.

3. The display device according to claim 1, wherein the parameter setter further determines the parameter by setting the ratio of the luminance value, which is equal to or larger than the predetermined value, to be equal to or smaller than the ratio of the average luminance value when:

the scene determiner determines that the input video image is of the scene comprising the dark background having the luminance value equal to or smaller than the first luminance value and the bright region having the luminance value equal to or larger than the second luminance value, which is larger than the first luminance value, and the bright region is determined to be concentrated in the image displayed on the display panel.

4. The display device according to claim 1, wherein the parameter setter further changes a relationship between a luminance value of the input video image and a luminance value of an output video image based on the scene determined by the scene determiner.

5. The display device according to claim 1, wherein the parameter setter further increases or decreases a blur intensity of the backlight based on the scene determined by the scene determiner.

6. A method of controlling a display device comprising a backlight that illuminates a display panel displaying an image by irradiating the display panel with light, the method comprising:

determining a scene of an input video image based on a luminance distribution of the input video image and a lighting rate of the backlight;

setting a parameter related to a luminance value applied to a plurality of areas of the backlight based on the determined scene;

controlling local dimming of the backlight for each of the plurality of areas based on the set parameter, wherein the parameter is set by deciding a ratio of the luminance value of each of the plurality of areas to an average luminance value of each of the plurality of areas in accordance with the determined scene, the luminance value being equal to or larger than a predetermined value, and using the decided ratio to set the parameter that is applied to each of the plurality of areas, and wherein the parameter is further determined by increasing a ratio of a luminance value, which is equal to or larger than the predetermined value, to be larger than a ratio of the average luminance value when:

the input video image is determined as being a scene comprising a dark background having a luminance value equal to or smaller than a first luminance value and a bright region having a luminance value equal to or larger than a second luminance value, which is larger than the first luminance value, and in the scene, a ratio of an area having the luminance value equal to or smaller than the first luminance value is greater than a ratio of an area having the luminance value equal to or larger than the second luminance value.

* * * * *